United States Patent

[11] 3,624,148

| [72] | Inventors | Sadayoshi Ninagawa;<br>Takashi Yamashita; Tetsuya Kato, all of<br>Kanagawa-ken, Japan |
|---|---|---|
| [21] | Appl. No. | 43,029 |
| [22] | Filed | June 3, 1970 |
| [45] | Patented | Nov. 30, 1971 |
| [73] | Assignee | Ajinomoto Co., Inc.<br>Tokyo, Japan |
| [32] | Priority | June 13, 1969 |
| [33] | | Japan |
| [31] | | 44/46097 |

[54] RECOVERY OF MALEIC ACID FROM ITS GASEOUS MIXTURES WITH ACETIC ACID
6 Claims, 3 Drawing Figs.

[52] U.S. Cl. ............................................. 260/537 N,
260/346.8, 260/533 N
[51] Int. Cl. ............................................. C07c 57/14
[50] Field of Search .......................................... 260/533 N,
537 N, 346.8

[56] References Cited
UNITED STATES PATENTS

| 2,638,481 | 5/1953 | Nachod ...................... | 260/533 N |
| 3,094,539 | 6/1963 | Bowman et al. .............. | 260/533 N X |
| 3,325,516 | 6/1967 | Feltis et al. .................. | 260/533 N X |
| 3,476,775 | 11/1969 | Sueur ........................... | 260/346.8 |
| 3,538,122 | 11/1970 | Friedrischen et al. ........ | 260/346.8 |

*Primary Examiner*—Lorraine A. Weinberger
*Assistant Examiner*—Richard D. Kelly
*Attorney*—Kelman and Berman ABSTRACT: Maleic acid values are recovered from a gas mixture essentially consisting of maleic acid, acetic acid, and an inert carrier gas, such as the product obtained by catalytic oxidation of certain petroleum refinery gases or natural gas fractions with air, by passing the gas mixture through a strong solution of acetic acid at a temperature between 60° C. and the boiling point, and preferably at 70° to 85° C. If the solution is sufficiently concentrated to be in acetic acid equilibrium with the gaseous mixture at such a temperature, it retains practically the entire maleic acid and none of the acetic acid from the gas mixture, so that maleic acid values in the form of maleic acid, fumaric acid, or maleic anhydride may be recovered from the absorption liquid.

RECOVERY OF MALEIC ACID FROM ITS GASEOUS MIXTURES WITH ACETIC ACID

This invention relates to the recovery of maleic acid from its gaseous mixtures with acetic acid, and particularly to the recovery of maleic acid values from gaseous mixtures of maleic acid with acetic acid and a large amount of an inert carrier gas.

When butene is oxidized with air in the vapor phase by the method of the U.S. Pat. No. 2,649,477, acetic acid is obtained as a byproduct. Conversely, maleic acid is a byproduct in the oxidation of hydrocarbons to acetic acid by the method of Belgian Pat. No. 677,753. If acetic acid is attempted to be recovered from the gaseous oxidation mixture, it is mixed with maleic acid, and the purification of the acetic acid by known methods is very difficult.

It was customary heretofore to recover maleic acid values from the oxidation mixture by washing the gas with water in an absorption tower, and to heat the aqueous solution so produced in a stripper to obtain a vapor of water and acetic acid, while a concentrated maleic anhydride solution was obtained as a residue, and was fractionally distilled to recover the desired product. The amount of water needed for absorption in the known method must be sufficient to dissolve all water-soluble compounds in the oxidation product, and the acetic acid recovered together with most of the water is therefore very dilute. Much thermal or other energy and voluminous apparatus are required for recovering the acetic acid in a commercially useful concentration.

We now have found that maleic acid may be separated from a gaseous mixture thereof with acetic acid by contacting the mixture, which is diluted by an inert carrier gas, with a strong acetic acid solution at a temperature between 60° C. and the boiling temperature of the solution.

The invention is based on findings partly illustrated in the appended drawing in which:

FIG. 1 diagrammatically illustrates the solubility of maleic acid in strong aqueous solutions of acetic acid at various temperatures;

Figure 1:
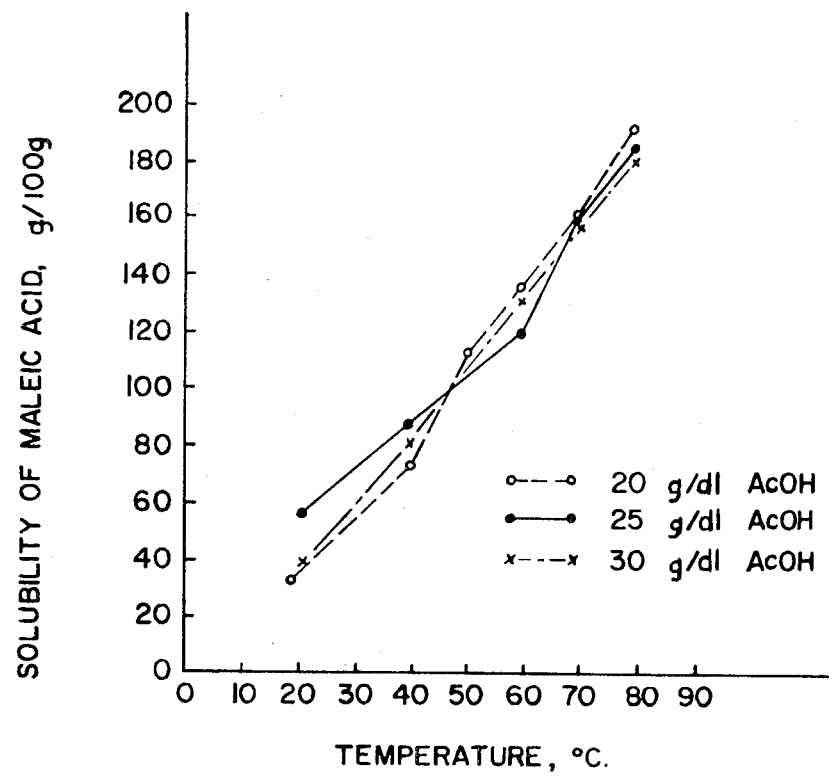

It has been found that the solubility of maleic acid in a strong aqueous solution of acetic acid increases rapidly with the temperature, as is illustrated for aqueous solutions containing 20, 25, and 30 g./dl. acetic acid (AcOH) in FIG. 1.

It has also been found that acetaldehyde, formaldehyde, acrolein, methacrolein, formic acid, acrylic acid, methacrylic acid, and like impurities normally accompanying maleic and acetic acid in the gaseous oxidation mixture produced from hydrocarbons are much less soluble than maleic acid in strong, hot acetic acid solutions.

Furthermore, gaseous acetic acid is not significantly more soluble in hot water than in a hot aqueous solution of much maleic acid. In other words, the volume of a strong acetic acid solution having a temperature of 60° C. or more may be increased greatly by dissolving maleic acid therein. Yet, the solution so obtained may be practically as saturated with gaseous acetic acid as the starting solution and not tend to absorb acetic acid from a gas. Also, the solubility of maleic acid in hot, strong acetic acid solutions is so great that a solution already containing much maleic acid is still capable of stripping practically all the maleic acid from a gas with which it is in contact as is illustrated by the following test.

An aqueous solution of 22.4 g./dl. acetic acid and 3 g./dl. maleic acid was evaporated at a rate of 10 ml. per hour, and the vapors so produced were mixed with an air stream of 5 liters per hour. The vapor-laden air was passed through 100 ml. of aqueous liquid containing 31 g. acetic acid which was kept at such a temperature that the amount of condensable components (water, acetic acid, maleic acid) in the entering gas mixture was practically the same as in the gas discharged from the absorption liquid, and the volume of the absorption liquid thus was practically constant. The discharged gas was passed through a condenser, and the condensate was sampled.

The necessary starting temperature of the absorption liquid free from maleic acid was 72.5° C., and the initial condensate was found to contain 0.03 g. maleic acid per 100 ml. When the absorption solution contained 80 g. maleic acid, its temperature had to be raised to 79° C., and 0.06 g./100 ml. maleic acid were found in the condensate. At 160 g. maleic acid in the absorption liquid at 83° C., the condensate contained 0.09 g./100 ml. maleic acid.

Methylmaleic acid, if present as a contaminant, is absorbed together with the maleic acid in the strong acetic acid solution, but does not interfere with the absorption of the maleic acid nor with subsequent recovery of maleic acid values from the absorption liquid.

At temperatures of less than 60° C., the solubility of maleic acid in strong acetic acid is relatively low, as is evident from FIG. 1, and the absorption of maleic acid from the gaseous mixture is too inefficient to be commercially practical. At the boiling temperature of the strong acetic acid solution, absorption becomes impossible, and it is difficult to perform the absorption process at temperatures close to the boiling point. It is not normally practical to perform the process of this invention on an industrial scale at temperatures outside the range of 60° to 90° C., and preferred to operate at 70° to 85° C. for reasons of economy. The gas pressure is immaterial, and it is preferred to operate at atmospheric pressure.

Figure 2:
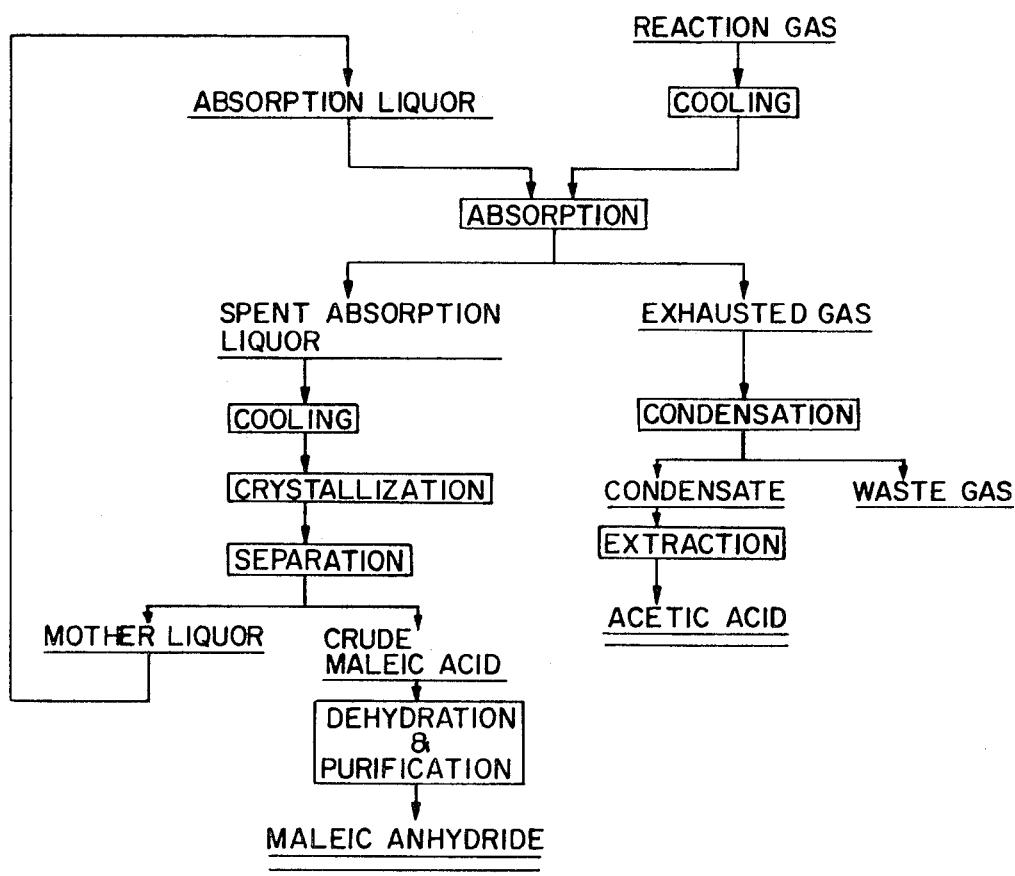
FIG. 2 is a flow diagram of an industrial embodiment of this invention.

The recovery of maleic acid according to this invention from a reaction mixture obtained by catalytic oxidation of hydrocarbons is illustrated diagrammatically in FIG. 2.

The reactor discharges a gas containing much inert air and small amounts of acetic acid and maleic acid together with somewhat larger amounts of water vapor as the principal oxidation products. The gaseous mixture has a temperature of more than 150° C. and is first cooled to a temperature of approximately 65° to 95° C. If a condensate is formed thereby, it is preferably removed.

The cooled gas is then brought into countercurrent contact with a strong aqueous solution of acetic acid containing maleic acid and resulting from a previous run as will presently become apparent. The absorption tower employed is equipped with heaters which permit to maintain a uniform elevated temperature throughout the descending liquid, or to keep a temperature of the liquid at the bottom of the tower higher than that at the top where the gas enters and the liquid is withdrawn.

Air laden with water vapor and acetic acid vapor, but practically stripped of its initial maleic acid content is exhausted from the top of the tower and passed through a condenser. Acetic acid may be recovered from the condensate by extraction with ethyl acetate or isopropyl ether and evaporation of the solvent in a known manner. The noncondensable gas, essentially air, is released as a harmless waste gas.

The spent absorption liquid withdrawn from the bottom of the column may contain 2 to 5 times as much maleic acid as acetic acid. When it is cooled, for example, to 30° C. from its operating temperature of more than 60° C., it becomes supersaturated with maleic acid, and the latter crystallizes and is separated from the mother liquor by decanting, filtering, or centrifuging. The mother liquor is returned to the top of the column. The crystals, which may contain small amounts of fumaric acid and methylmaleic acid may be converted to maleic anhydride, and the latter is readily purified to 99.9 percent in a known manner. In continuous absorption, the absorption liquid, which may initially be a solution of acetic acid in water, ultimately becomes saturated with maleic acid, methylmaleic acid, and other water-soluble constituents of the original gas at the chosen crystallization temperature, and thereafter maintains a constant composition.

It has been found that the ratio between the amount of condensable components (F. ml.) in the gas supplied to the absorption tower to the amount of condensable components (D. ml.) in the discharged gas can be controlled between values of 0.8:1 and 1.8:1 by controlling the temperature of the absorption liquid.

Figure 3:
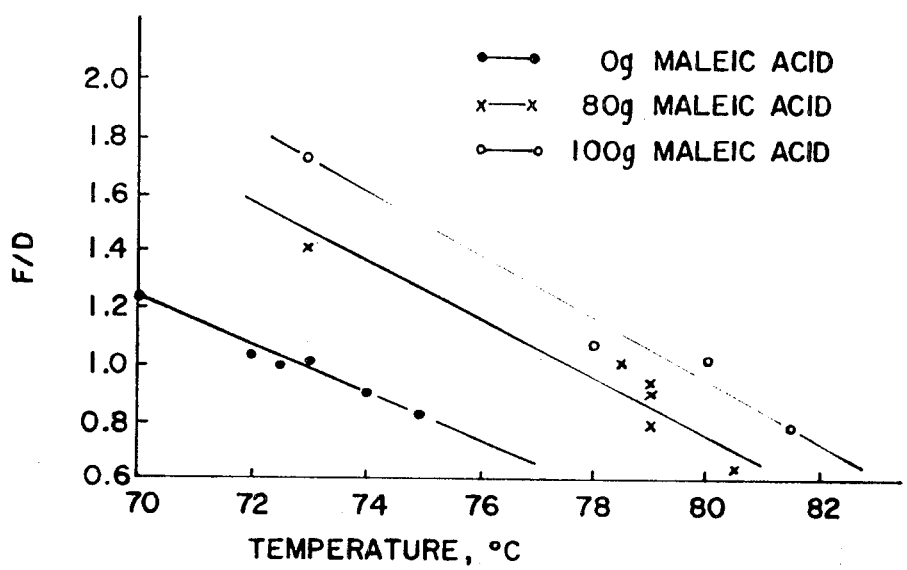
FIG. 3 shows the relationship between the amount of condensable components in a gas mixture fed to an absorption solution of the invention and the amount of condensable components in a gas discharged from the acetic acid solution as a function of the temperature and of the maleic acid content of the solution.

The ratio varies at constant temperature mainly with the amount of maleic acid in the absorption liquid, and can be held constant at a value of approximately 1:1 by gradually raising the temperature of the absorption liquid as the concentration of maleic acid increases. This is evident from the results of test runs illustrated in FIG. 3 in which the absorption liquid consisted of 100 ml. of an aqueous solution of acetic acid which, at the test temperature, was in acetic acid equilibrium with the gas passed therethrough and contained the indicated amounts of maleic acid. The gas consisted of 70 liters of air per hour and 20 ml. per hour of an aqueous solution vaporized into the air stream and containing 25 g./dl. acetic acid and 0.3 g./dl. maleic acid in the tests with an absorption solution initially free from maleic acid, and 25 g./dl. acetic acid and 3.0 g./dl. maleic acid in the other tests.

When the ratio F./D. is kept approximately at a value of 1, by suitable temperature control, all other operating conditions are readily kept constant in continuous operation, and all operating conditions other than the maleic acid concentration of the absorption liquid are kept constant in batch operation.

As is seen from FIG. 1, 80 to 160 g. maleic acid are readily stored in 100 g. of absorption liquid at temperatures between 70° and 85° C., and are readily recovered by crystallization when the temperature of the liquid is lowered.

However, maleic acid values may be recovered from the absorption liquid without separating the maleic acid from the liquid. If the hot absorption liquid is further heated in the presence of a small amount of acid, insoluble fumaric acid is formed and may be recovered in the solid state, whereupon the mother liquor may be used for further absorption of maleic acid from its gaseous mixture with acetic acid and a carrier gas. If so desired, the maleic acid may also be dehydrated to the anhydride without separating it from the entire absorption liquid, and the maleic anhydride recovered in a conventional manner.

The amount of acetic acid in the absorption liquid is normally between 10 g. and 50 g. per deciliter of the combined volume of water and acetic acid, and is preferably chosen in such a manner that the liquid is in acetic acid equilibrium with the gaseous mixture at the prevailing temperature so that the acetic acid concentration of the liquid phase and the gaseous phase is not significantly changed by the absorption process.

The specific ratio of acetic acid and maleic acid in the mixture to be separated is not relevant to the success of the operation. The method is employed successfully in removing even minute traces of maleic acid from a vast excess of acetic acid, and it is effective in stripping maleic acid selectively from a gas mixture whose acetic acid content is minimal.

The following examples are further illustrative of this invention.

EXAMPLE 1

50 g. Maleic acid were dissolved in 100 g. of an aqueous solution of 36.83 g./dl. acetic acid. The liquid mixture so obtained was placed in an absorption bulb and kept at a temperature gradually increasing from 75° to 82° C. while a stream of air at a rate of 70 liters per hour was passed for 80 hours. The air stream was charged with vapors from an aqueous solution of 25 g./dl. acetic acid and 3 g./dl. maleic acid at a rate of 20 ml. of liquid per hour. The temperature of the absorption liquid was controlled in such a manner that the amount of condensable components in the discharged gas was practically equal to the amount of condensable components in the gas supplied to the bulb.

At the termination of the run, 1,600 ml. of the acetic-maleic acid solution had been vaporized and introduced into the absorption bulb, and 1,580 ml. of aqueous liquid had been recovered from the discharged gas by passage through a condenser. The condensate contained 24.96 g./dl. acetic acid and 0.062 g./dl. maleic acid, indicating that only 1.5 percent of the additionally supplied acetic acid, but 98.0 percent of the supplied maleic acid vapor had been retained in the absorption bulb.

The contents of the bulb were cooled to 30° C., and the crystals formed thereby were filtered off and dried. They weighed 32 g. and were found by NMR spectroscopy to consist of 95.5 percent maleic acid and 4.5 percent fumaric acid. The mother liquor was suitable for immediate use in another similar run.

EXAMPLE 2

The aforementioned absorption bulb was charged with 100 g. of a solution of 32 g./dl. acetic acid in water, and air was passed through the bulb at a rate of 70 liters per hour for 20 hours. The air was mixed with vapors of a solution of 25 g./dl. maleic acid, 22.4 g./dl. acetic acid and 3 g./dl. crotonaldehyde, which was evaporated at a rate of approximately 20 ml. per hour. The temperature of the absorption liquid was gradually raised from 73° to 82° C. in order to maintain the desired balance of the condensable components supplied to and withdrawn from the absorption bulb. The discharged gas and vapors were passed through a condenser.

The total amount of vaporized solution was 390 ml. and 375 ml. of condensate were collected. The condensate contained 20.3 g./dl. acetic acid, 0.08 g./dl. maleic acid, and 2.8 g./dl. crotonaldehyde. The absorption liquid thus retained 12.8 percent of the acetic acid supplied, 99.8 percent of the maleic acid, and 10.3 percent of the crotonaldehyde.

When the absorption liquid was cooled to 30° C., crystals were formed and recovered as in example 1. They weighed 46 g. and consisted of 96.3 percent maleic acid and 3.7 percent fumaric acid, as determined from their NMR spectrum. No crotonaldehyde could be detected in the solid material. The mother liquor was ready for use in another absorption run.

EXAMPLE 3

A $C_4$ fraction of petroleum refinery gas containing 86.2 percent butene by volume was oxidized with air in the gas phase over a vanadium-chromium catalyst in a conventional manner. The reaction gas was cooled to 80° C. and passed for 10 hours through an absorption bulb containing an aqueous liquid prepared from 100 g. of 36.0 g./dl. acetic acid solution, 50 g. maleic acid, and 20 g. methylmaleic acid. The flow rate of the gas was controlled to supply 20 ml. of condensable components per hour. The temperature of the absorption liquid was raised from 71° to 83° C. to release approximately as much of condensable components with the discharged gas as was received with the gas stream. Actually, 1,960 ml. condensable material were received and 1,920 ml. were discharged. The gas discharged was passed through a condenser, and the condensate was collected.

The condensable fraction of the feed gas and the collected condensate had the following compositions:

|  | Feed gas, g./dl. | Condensate, g./dl. |
|---|---|---|
| Acetic acid | 27.2 | 27.0 |
| Maleic acid | 1.04 | 0.04 |
| Methylmaleic acid | 0.94 | 0.78 |
| Formic acid | 0.12 | 0.09 |
| Acetone | 0.06 | 0.06 |
| Acetaldehyde | 0.03 | 0.00 |
| Acrylic acid | 0.03 | 0.005 |
| Methacrylic acid | 0.004 | 0.001 |
|  | Feed gas, g./dl. | Condensate, g./dl. |
| Formaldehyde | 0.002 | 0.001 |
| Propionic acid | ± | ± |

These figures indicate that 2.8 percent of the supplied acetic acid, 96.3 percent of the supplied maleic acid, and 18.5 percent of the supplied methylmaleic acid were retained by the absorption liquid.

When the absorption liquid was cooled to 30° C., a crystalline material weighing 19.8 g. was recovered. As determined by its NMR spectrum, it consisted of 94 percent maleic acid, 4 percent fumaric acid, and 2 percent methylmaleic acid.

While the invention has been described with particular reference to specific embodiments, it is to be understood that it is not limited thereto, but is to be construed broadly and restricted solely by the scope of the appended claims.

What is claimed is:

1. A method of separating maleic acid values from a gaseous mixture containing acetic acid, maleic acid and an inert carrier gas which comprises:
   a. contacting said mixture with a strong aqueous solution of acetic acid at a temperature above 60° C. but below the boiling point of said solution until said maleic acid is dissolved in said solution; and
   b. recovering the maleic acid values from said solution.

2. A method as set forth in claim 1, wherein said strong acetic acid solution is in acetic acid equilibrium with said gaseous mixture at said temperature.

3. A method as set forth in claim 1, wherein the acetic acid concentration of said solution is between 10 and 50 grams per deciliter.

4. A method as set forth in claim 1, wherein the amount of said carrier is much greater than the amount of said acids in said gaseous mixture.

5. A method as set forth in claim 4, wherein said carrier is substantially insoluble in said aqueous solution, said gaseous mixture being continuously passed through said solution, said maleic acid being absorbed from the passing mixture by said solution, the acetic acid concentration of said solution being sufficient and said temperature being increased during said passing to substantially prevent absorption of acetic acid from said mixture during said passing as the concentration of maleic acid absorbed by said solution increases.

6. A method as set forth in claim 5, wherein the acetic acid concentration of said aqueous solution is between 10 and 50 grams per deciliter.

* * * * *